UNITED STATES PATENT OFFICE.

CARL REISSER, OF STUTTGART, GERMANY.

ART OF PREPARING PLASTIC COMPOUNDS.

SPECIFICATION forming part of Letters Patent No. 685,460, dated October 29, 1901.

Application filed February 25, 1901. Serial No. 48,790. (No specimens.)

*To all whom it may concern:*

Be it known that I, CARL REISSER, a citizen of the Empire of Germany, residing at Stuttgart, in the Empire of Germany, have invented certain new and useful Improvements in the Art of Preparing Plastic Compounds; and I do hereby declare the following to be a full, clear, and exact description of the invention, such as will enable others skilled in the art to which it appertains to make and use the same.

The present invention relates to the art of preparing plastic compounds, and in particular compounds having the appearance of plaster-of-paris, the object being to provide a mass of a considerably less specific gravity than plaster-of-paris and which is much less fragile and is for this reason particularly adapted for preparing therefrom models and casts for educational purposes—for example, in connection with drawing classes—and also for ornamental purposes for adorning the interior and exterior of buildings and the like.

The models hitherto used in schools for free-hand drawing and also the moldings and stucco ornaments extensively employed in the building arts are all open to the objection that they are very heavy and are very easily fractured and destroyed and must therefore be handled with a considerable amount of care.

By virtue of the present invention I am enabled to provide a mass of low specific gravity of great resisting powers and which at the same time has the appearance of plaster-of-paris and which is particularly well adapted for the purposes above indicated.

In order to fully disclose my invention, I will now describe in detail the preferable manner in which I carry the same into practice.

I take about two parts of the form of sulfate of lime known as "alabaster" and about one part of chemically pure whiting or chalk purified by elutriation and add the same to a gelatinous or glue solution, preferably of what is known as "French hare-skin glue," and keep the mixture warm and stir the same until a thin liquid mass is obtained. Thereupon I add to this thin liquid mass any vegetable fiber, such as cotton or cellulose, mixing the same and adding the said vegetable fiber in such quantities that a viscous or pasty mass is obtained. From this mass the models, building ornaments, casts, &c., are directly formed by pouring or transferring the same in suitable molds.

It is to be noted that I do not use the term "gelatinous solution" in its broad sense of including solutions of the soluble silicates. On the contrary, it is to be understood that by the term "gelatinous solution" I intend to include solutions only of those organic substances resembling glue or gelatin, this being the sense in which the term "gelatinous solution" is ordinarily employed. I find that the models, casts, or ornaments formed in this manner are very strong and resisting, so that even delicate ornaments and open fretted work may be produced which is almost unbreakable. Models and casts made from this mass are particularly adapted for educational purposes, because they embody all of the advantages of plastic casts without the disadvantages accompanying them, as hereinabove set forth. The decorative moldings, stucco ornamentations, and other articles for buildings are also exceedingly well adapted for mural and ceiling decorations, since they may be nailed to the walls, &c., and are very light and durable.

It is evident that other articles may be made from the above-described mass. It is also manifest that the proportions above given may be varied within considerable limits without departing from the gist of the present invention, which is more particularly pointed out in the claims hereunto annexed.

What I claim, and desire to secure by Letters Patent, is—

1. The process of preparing plastic compositions for models, casts and mural decorations, which consists in adding a salt of calcium to a gelatinous or glue solution and thereupon adding to the mixture thus formed a fibrous material.

2. The process of preparing plastic compositions for models, casts and mural decorations which consists in first making a mixture of different salts of lime, then adding this mixture to a gelatinous or glue solution, and thereupon adding a fibrous material.

3. The process of preparing plastic compositions for models, casts and mural decorations which consists in first mixing a sulfate of lime with another salt of lime, then adding this mixture to a gelatinous or glue solution, and thereupon adding a fibrous material.

4. The process of preparing plastic compositions for models, casts and mural decorations which consists in first mixing two parts of a sulfate of lime with one part of a carbonate of lime, then adding this mixture to a gelatinous or glue solution, and thereupon adding a fibrous material to the mixture.

5. The process of preparing plastic compositions for models, casts, and mural decorations which consists in adding a mixture of alabaster and whiting to a gelatinous or glue solution and thereupon adding to the mixture thus formed fibrous material.

6. The process of forming plastic composition for models, casts and mural decorations which consists in adding a mixture consisting substantially of two parts of alabaster and one part whiting to a glue solution, stirring and warming the same until a thin liquid mass is formed, and then adding sufficient vegetable fiber to form a semiliquid or pasty mass.

7. The process for forming plastic composition for models, casts, and mural decorations, which consists in adding a mixture consisting substantially of two parts alabaster and one part chemically pure whiting to a solution of French hare-skin glue, warming and stirring until a thin liquid mass is formed and then mixing this solution with vegetable fiber until a semiliquid or pasty mass is formed.

8. A compound free from silicates, for the manufacture of models, casts, mural decorations and the like, said compound containing a salt of calcium in combination with a gelatinous substance and fibrous material.

9. A compound free from silicates, for the manufacture of models, casts, mural decorations and the like, which consists of a mixture of gypsum with a gelatinous substance and vegetable fibrous material.

10. A compound for the manufacture of models, casts and mural decorations and the like which consists of a mixture of alabaster and whiting in combination with a gelatinous substance and fibrous material.

11. A compound for the manufacture of models, casts and mural decorations and the like which consists of a mixture of substantially two parts of alabaster with chemically pure whiting combined with French hare-skin glue and vegetable fiber.

In testimony whereof I affix my signature in presence of two witnesses.

CARL REISSER.

Witnesses:
 A. DRAUTZ,
 HE. REICHARDT.